United States Patent
Taniuchi et al.

(10) Patent No.: US 10,279,546 B2
(45) Date of Patent: May 7, 2019

(54) METHOD FOR MANUFACTURING STRUCTURAL BODY AND MANUFACTURING APPARATUS THEREFOR

(71) Applicant: CANON KABUSHIKI KAISHA, Tokyo (JP)

(72) Inventors: Hiroshi Taniuchi, Yokohama (JP); Kazuhiro Nakajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 14/897,226

(22) PCT Filed: Jun. 16, 2014

(86) PCT No.: PCT/JP2014/003195
§ 371 (c)(1),
(2) Date: Dec. 9, 2015

(87) PCT Pub. No.: WO2014/203517
PCT Pub. Date: Dec. 24, 2014

(65) Prior Publication Data
US 2016/0121552 A1    May 5, 2016

(30) Foreign Application Priority Data

Jun. 18, 2013  (JP) ................................. 2013-127877

(51) Int. Cl.
*B29C 67/00* (2017.01)
*B33Y 10/00* (2015.01)
(Continued)

(52) U.S. Cl.
CPC ........ *B29C 67/0092* (2013.01); *B29C 64/112* (2017.08); *B29C 64/20* (2017.08);
(Continued)

(58) Field of Classification Search
CPC ..... B32B 37/02; B29C 67/0092; B33Y 10/00; B33Y 30/00
(Continued)

(56) References Cited

U.S. PATENT DOCUMENTS

| 6,136,132 A | 10/2000 | Kinzie |
| 2001/0042598 A1 | 11/2001 | Yamada |

FOREIGN PATENT DOCUMENTS

| CN | 2336893 Y | 9/1999 |
| CN | 2936746 Y | 8/2007 |

(Continued)

*Primary Examiner* — Philip C Tucker
*Assistant Examiner* — John Blades
(74) *Attorney, Agent, or Firm* — Canon USA, Inc., IP Division

(57) ABSTRACT

In structural body formation, influence of misalignment between an in-process structural body layer and a support member layer on the shape accuracy is reduced.

A method for manufacturing a structural body includes: forming a model forming layer from a liquid model forming material on an existing surface formed of at least one of prepared model forming layer and support member; while a defining surface of a defining member defining the upper surface of the model forming layer is in contact therewith; supplying a support material to fill between the existing surface and the defining surface and solidifying the support material into a support member to form a layer of the model forming layer and the support member; removing the defining member; and providing a layer of a model forming layer and a support member on the surface of the layer exposed by removal of the defining member.

16 Claims, 5 Drawing Sheets

(51) Int. Cl.
*B33Y 30/00* (2015.01)
*B29C 64/112* (2017.01)
*B29C 64/20* (2017.01)
*B29C 64/40* (2017.01)

(52) U.S. Cl.
CPC ............. *B29C 64/40* (2017.08); *B33Y 10/00* (2014.12); *B33Y 30/00* (2014.12)

(58) Field of Classification Search
USPC .................. 156/273.3, 273.5, 273.7, 275.5
See application file for complete search history.

(56) References Cited

FOREIGN PATENT DOCUMENTS

| | | | | |
|---|---|---|---|---|
| CN | 102602146 | A | 7/2012 | |
| CN | 202934940 | U | 5/2013 | |
| EP | 2447045 | A2 | 5/2012 | |
| JP | H08-281808 | A | 10/1996 | |
| JP | 2003-159754 | A | 6/2003 | |
| JP | 2003159754 | * | 6/2003 | ............. B29C 67/00 |
| JP | 2012-096430 | A | 5/2012 | |
| JP | 201296430 | * | 5/2012 | ............. B29C 67/00 |
| JP | 2013-067121 | A | 4/2013 | |
| WO | 2004/016406 | A1 | 2/2004 | |
| WO | 2013/190817 | A1 | 12/2013 | |
| WO | 2014/092205 | A1 | 6/2014 | |

* cited by examiner

METHOD FOR MANUFACTURING STRUCTURAL BODY AND MANUFACTURING APPARATUS THEREFOR

TECHNICAL FIELD

The present invention relates to a method for manufacturing a structural body and a manufacturing apparatus therefore.

BACKGROUND ART

Heretofore, lamination type three-dimensional object forming methods (hereinafter referred to as "laminate forming method(s)"), such as stereolithography, have been actively used in many fields. The methods described above are each a method for forming an arbitrary three-dimensional object by sequentially laminating cross-sectional patterns thereof. In those methods, a three-dimensional object can be directly formed from a three-dimensional (design) data without using a mold or the like. Hence, those methods have been frequently used, for example, for prototype production in which a small number of three-dimensional objects are highly required to be prepared in a short period of time.

As characteristic restriction of the laminate forming method, for example, an indispensable support may be mentioned. In the laminate forming method, since layer-shaped patterns are laminated to each other, for example, an object having an isolated portion, such as a front end of a hanging tree branch, in the course of manufacturing cannot be manufactured in principle. In order to form the portion as described above by the laminate forming method, it is necessary that a support, which is not necessary in a final state, be formed under the isolated portion and then removed by some type of method after the object is formed.

The removal of the support is basically carried out by person's hand working. In the laminate forming method, in general, instead of forming a large number of the same object, objects having different shapes are manufactured in many cases in accordance with requirements from users. Hence, it has been very difficult to automatically remove supports from the objects having different shapes as described above.

In order to reduce the support removing burden, a method has been known in which the support is formed from a material different from a model forming material which forms the object. According to this method, when a melting agent which melts a support material but not the model forming material is used, the support can be easily removed. In addition, even when a material which is not melted but is easily removed is used, the support removing burden can be significantly reduced.

In the laminate forming method, in order to realize object formation with an excellent accuracy, the thickness of each layer to be laminated is also required to have a sufficient accuracy. In order to preferentially realize easy removal of the support, when the support is formed from a material different from the model forming material, patterns formed from two types of materials are necessarily aligned with each other with a high accuracy. When the patterns are not well aligned with each other, a gap is formed therebetween, and an overhanging portion may not be supported. In addition, when the model forming material and the support material are overlapped with each other, a protrusion may be formed, or adhesion of the surface of the model forming material may be degraded, so that the strength of the three-dimensional object may be decreased in some cases. In addition, when layers having a uniform thickness are formed from different materials, in view of the accuracy necessary for material supply and the change in volume caused by environmental influences, significantly tight control is required.

United States Patent Application No. 2001/0042598 has disclosed a method in which after a layer having a shape of a part of a final three-dimensional object is formed, a material to be used as a support is provided so as to surround this layer, and the upper surface of the support is then ground to have a design thickness. According to the method described above, subsequently, a material which forms the three-dimensional object is further laminated on the support and the layer which forms an in-process three-dimensional object.

However, according to the method described above, if a removed material which is ground off again adheres to the object, the quality of the three-dimensional object to be manufactured may not be sufficiently satisfied in some cases. In addition, the case in which a fine model forming portion cannot be formed to have a desired shape due to heat and/or a mechanical stress generated during grinding may occur in some cases. Furthermore, in order to perform highly accurate grinding, a very long processing time is required.

CITATION LIST

Patent Literature

PTL 1: United States Patent Application No. 2001/0042598

SUMMARY OF INVENTION

In consideration of the above problems, the present invention provides a method and an apparatus each capable of manufacturing a structural body with an excellent shape accuracy.

Solution Problem

According to one aspect of the present invention, there is provided a method for manufacturing a structural body in which while an in-process structural body is supported by a support member on a model forming table, a model forming layer which forms the structural body is laminated, and the method described above comprises the steps of: supplying a liquid model forming material which forms the model forming layer on an existing surface formed of at least one of the model forming layer, the support member, and the model forming table to form a model forming layer from the model forming material; while a defining surface of a defining member which defines the upper surface of the model forming layer opposite to the existing surface is in contact with the upper surface of the model forming layer, supplying a support material which forms the support member to fill a space between the existing surface around the periphery of the model forming layer and the defining surface and forming a support member by solidifying the support material to form a layer composed of the support member and the model forming layer; and removing the defining member from the layer composed of the support member and the model forming layer.

Further features of the present invention will become apparent from the following description of exemplary embodiments with reference to the attached drawings.

BRIEF DESCRIPTION OF DRAWINGS

FIG. 1 is a schematic view showing one example of a laminate forming apparatus according to an embodiment of the present invention.

FIGS. 2A to 2E are each a schematic cross-sectional view showing a step of one example of a method for manufacturing a structural body according to an embodiment of the present invention.

[FIG. 2B] FIGS. 2A to 2E are each a schematic cross-sectional view showing a step of one example of a method for manufacturing a structural body according to an embodiment of the present invention.

[FIG. 2C] FIGS. 2A to 2E are each a schematic cross-sectional view showing a step of one example of a method for manufacturing a structural body according to an embodiment of the present invention.

[FIG. 2D] FIGS. 2A to 2E are each a schematic cross-sectional view showing a step of one example of a method for manufacturing a structural body according to an embodiment of the present invention.

[FIG. 2E] FIGS. 2A to 2E are each a schematic cross-sectional view showing a step of one example of a method for manufacturing a structural body according to an embodiment of the present invention.

FIGS. 3A to 3D are each a schematic cross-sectional view showing a step of one example of the method for manufacturing a structural body according to the embodiment of the present invention.

[FIG. 3B] FIGS. 3A to 3D are each a schematic cross-sectional view showing a step of one example of the method for manufacturing a structural body according to the embodiment of the present invention.

[FIG. 3C[ FIGS. 3A to 3D are each a schematic cross-sectional view showing a step of one example of the method for manufacturing a structural body according to the embodiment of the present invention.

[FIG. 3D] FIGS. 3A to 3D are each a schematic cross-sectional view showing a step of one example of the method for manufacturing a structural body according to the embodiment of the present invention.

FIG. 4 is a conceptual diagram showing the function of the laminate forming apparatus according to the embodiment of the present invention.

DESCRIPTION OF EMBODIMENTS

Hereinafter, with reference to the drawings, embodiments of the present invention will be described.

Embodiments

Figure 1:
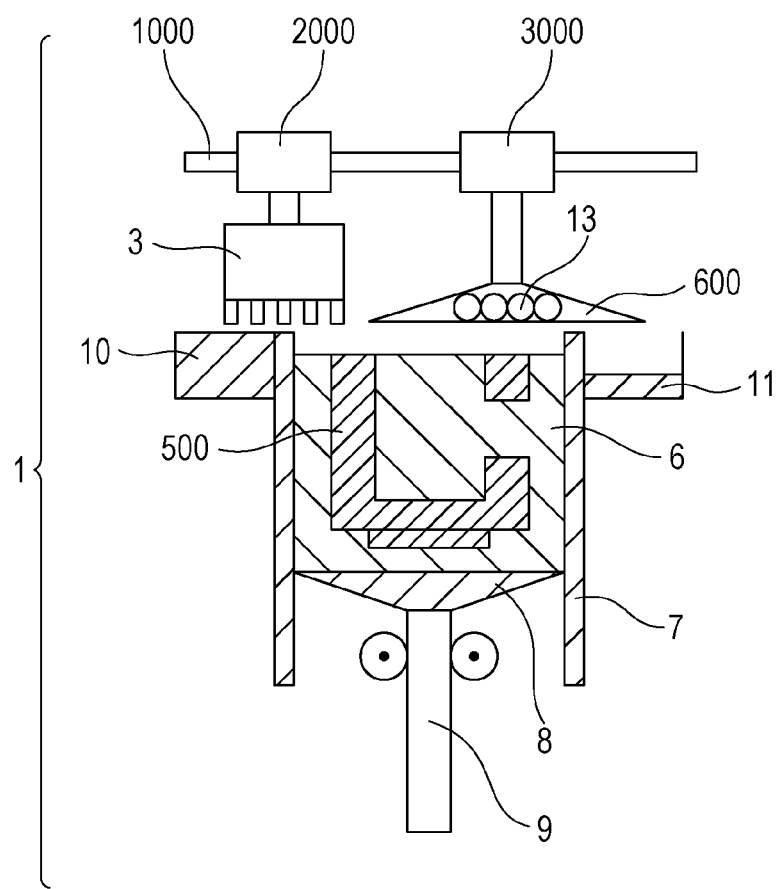
[FIG. 1]

FIG. 1 is a schematic view showing one example of a laminate forming apparatus which is a manufacturing apparatus performing a method for manufacturing an object, that is, a three-dimensional structural body, according to a first embodiment of the present invention. A guide shaft 1000 of a laminate forming apparatus 1 is provided with a liquid ejection head 3 connected to a lift mechanism 2000 and a defining member 600 which accommodates UV lamps 13 therein and which is connected to a lift mechanism 3000. The height of the liquid ejection head 3 and the height of the defining member 600 can be controlled by the respective lift mechanisms. The liquid ejection head 3 can eject a liquid material which forms a structural body in a model forming container 7. On a model forming table 8, a model forming layer 500 is formed by lamination as an in-process structural body and is supported by a support member 6 which functions to support the structural body. The model forming table 8 is formed so that the periphery thereof is surrounded by the model forming container 7, and the height of the model forming table 8 is controlled by a lift mechanism 9. The support member 6 is formed by injecting a support material into the model forming container 7 by a support filling mechanism 10 provided at an upper portion of a side surface of the model forming container 7. In addition, a support receiver 11 is connected to the model forming container 7 to receive a discharged excessive support material. In addition, after the lamination of layers each having a model forming pattern is completed, the support member 6 can be removed by the use of a support removal mechanism (not shown).

Next, with reference to FIGS. 2A to 3D, model forming steps will be described. FIGS. 2A to 3D are each a cross-sectional view schematically showing a step of a process for manufacturing a structural body according to an embodiment of the present invention.

Figure 2A:
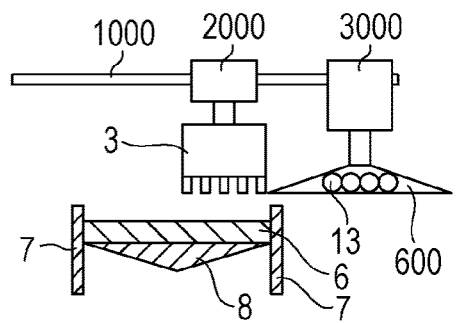
[FIG. 2A]

First, as shown in FIG. 2A, the liquid ejection head 3 is moved along the guide shaft 1000 by the lift mechanism 2000 so as to face the upper surface of the support member 6. In this step, as a first layer, a layer (release layer) composed only of the support member 6 is formed on the model forming table 8 without directly providing a model forming pattern thereon, and a model forming layer is then laminated on the layer of the support member 6. By the step as described above, after the structural body is completed, the structural body can be separated from the model forming table 8 by removal of the support member 6, so that the structural body can be easily recovered. This first layer of the support member 6 is formed in such a way that after the surface of the defining member 600 and the upper surface of the model forming table 8 are set so as to have a gap therebetween corresponding to the thickness of one layer, and the gap is filled with a support material which forms the support member 6 by injection. Subsequently, when the model forming table 8 is lowered down by a distance corresponding to the thickness of one layer, the first layer (release layer) is completed. Alternatively, without providing the release layer, the first layer may also be formed by directly providing an ink pattern 4 for forming a model forming layer which will be described later and a support material 5 on the surface of the model forming table 8.

Figure 2B:
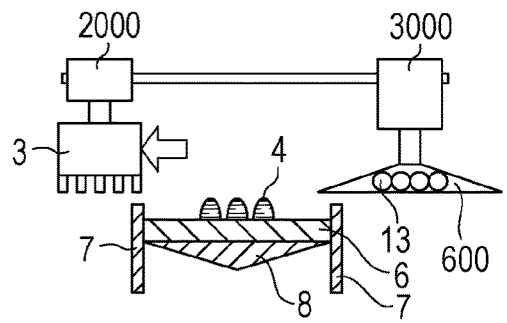

Next, as shown in FIG. 2B, while being moved in an arrow direction, the liquid ejection head 3 ejects an ink functioning as a model forming material of the model forming layer which forms a part of the structural body, so that the ink pattern 4 is provided on the upper surface of the support member 6. In this embodiment, as a method to provide a material which forms the model forming layer 500, a method in which an ink is ejected at a predetermined position by an ejection head having an ejection port which ejects a liquid is described by way of example, the method is not limited thereto. As examples of other methods, a digital recording device, such as an electrophotographic printer or a dispenser, may be used, and an analog type patterning method, such as offset printing or screen printing, using a printing plate may also be used by changing a printing plate to be used. Among those mentioned above, an ink jet method capable of performing noncontact patterning is a preferable patterning method. In addition, in this embodiment, as the ink, an UV ink is used. Since being supplied in the form of liquid and changed into a solid plastic by UV irradiation, the UV ink is preferable because of its light weight and relatively tough properties. Besides the UV ink, for example, a hot-melt ink or a thermosetting ink may also be preferably used. In addition, by using a plurality of ink pattern forming methods, for example, materials may be compounded with each other, or a desired color may also be formed. Furthermore, coloring may also be simultaneously performed together with patterning. In addition, of course, the release layer may also be provided to have a thickness corresponding to the thickness of two layers or more.

Figure 2C:
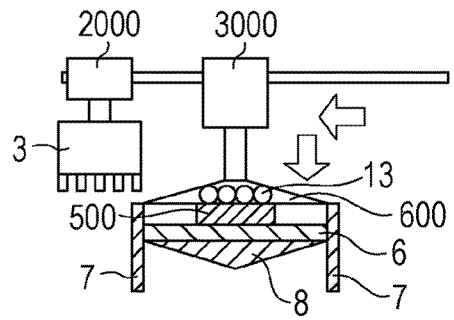

Next, after the liquid ejection head 3 is withdrawn from an upper portion of a laminate unit, as shown in FIG. 2C, the defining member 600 is lowered down in an arrow direction by the lift mechanism 3000. The defining member 600 is lowered down so that the gap between the defining member 600 and the release layer is set to a design gap, and a defining surface of the defining member 600 is brought into contact with the upper surface of the ink pattern 4. In this step, it is preferable that the amount of the UV ink functioning as a model forming material be appropriately controlled. When the amount of the model forming material is excessively large, a strain of the pattern may become a concern, and when the amount of the model forming material is excessively small, insufficient contact between the model forming material and the defining surface may also become a concern in some cases; however, when the amount of the UV ink is appropriately controlled, the concerns described above can be reduced. In this step, UV lamps are provided in the defining member 600, and the UV ink is cured by irradiation of UV light. Alternatively, when the defining member 600 is formed from a material which allows UV light to pass therethrough, and the UV lamps are provided separately from the defining member 600, the ink pattern 4 may be irradiated with UV light through the defining member 600.

Figure 2D:
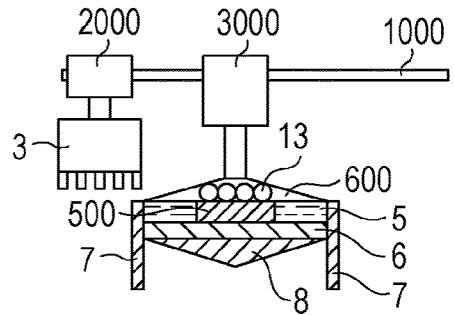

Next, as shown in FIG. 2D, while the upper surface of the model forming layer 500 thus formed is defined by the defining member 600, the support material 5 in a fluid state which forms the support member 6 is injected into the model forming container 7. As a material which forms the support member 6, a liquid material changeable into a solid material by a stimulus given from the outside is preferable. Furthermore, a material which can be easily removed from the object is preferable. As the stimulus from the outside, for example, heat, light, electric power, magnetic power, and vibration may be mentioned, and among those mentioned above, in particular, heat is a stimulus which can easily use the reversibility of the material. As the support material 5, for example, when a paraffin wax is used, after injection thereof is performed at a temperature equal to or more than the melting point of the paraffin wax, by decreasing the temperature equal to or lower than the melting point thereof, the paraffin wax can be solidified. Furthermore, when the melting point of the support member is set lower than that of the model forming material, after the model forming is completed, the support can be easily removed if the entire structure is maintained at a temperature equal to or more than the melting point of the support member and equal to or less than the melting point of the model forming material.

The model forming container 7 has a shape surrounding the periphery of the model forming table 8 and defines a filling region of the support material 5. Since the volume of the container is fixed to a design value, when the container is filled with the support material 5, and the support material 5 overflows, the injection thereof may be stopped. Since the support material automatically flows into the space in which the model forming layer 500 is not present, alignment, layer thickness control, and the like are not necessary. As described above, a support member which is accurately formed to have the same thickness as that of the model forming layer may be formed while consumption of the support material is suppressed. In addition, since being protected by the defining member 600, the upper surface of the model forming layer 500 is free from the adhesion of a support material which is to be supplied later. Hence, the adhesion to a layer to be formed next can be made excellent.

The injecting of the support material 5 may be performed using a common liquid transfer method, such as pressure injection or vacuum suction. In order to prevent filling defects, filling may be effectively assisted by an increase in fluidity of the support material by heating with a heater (not shown) functioning as a temperature control mechanism, by minute high-frequency vibration generated, for example, by an ultrasonic vibrator, or by pressure reduction.

Although the injecting of the support material 5 is preferably performed every lamination step, the injection may not be performed every lamination step in some cases. When a shape having no overhanging portion is formed in an object forming process, as long as the strength of an in-process object is sufficient, the support may not be used. In addition, even in the case in which an object having an overhanging portion is formed, when model forming layers having no overhanging portions are laminated to each other, the lamination thereof may be performed without performing support injection, and when a model forming layer having an overhanging portion is laminated, the support material in an amount corresponding to the space formed by a plurality of the layers may be collectively injected. In particular, when the thickness of the layer is small, and the support material is difficult to fill, in some cases, the injection thereof may be preferably performed with intervals.

Figure 2E:
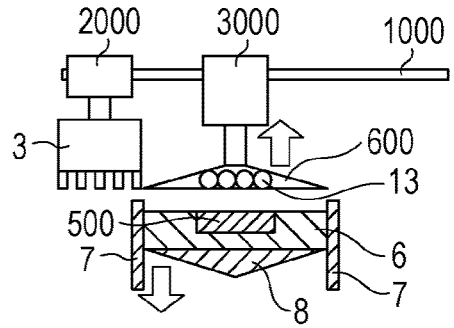

Subsequently, when the support material 5 is solidified into the support member 6 by spontaneous cooling or the like, as shown in FIG. 2E, the defining member 600 is removed from the model forming layer 500 and the support member 6. As a result, a layer is formed from the support member 6 and the model forming layer 500, and the upper surface of the layer is exposed. This upper surface is defined by the defining surface of the defining member 600 and is formed flat by the defining surface, so that the surface is formed to have substantially no step between the model forming layer 500 and the support member 6.

In this step, when the support material 5 is a material to be solidified by cooling, it may also be effective to provide as a mechanism to promote cooling, a water jacket or the like in the defining member 600 or the model forming container 7.

Next, when the model forming table 8 is lowered down by a distance corresponding to the thickness of one layer, lamination of the following layer is prepared. Steps following the process described above are steps of laminating the following layer, and description of steps using materials and methods similar to those described with reference to FIGS. 2A to 2E will be omitted.

Figure 3A:
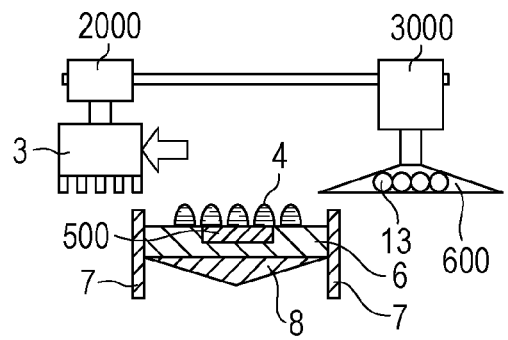
[FIG. 3A]

Subsequently, as shown in FIG. 3A, the liquid ejection head 3 ejects the ink while being moved in an arrow direction, and an ink pattern 4 is provided on an existing surface formed of the support member 6 and the model forming layer 500 which are prepared in the pervious process. The ink pattern 4 which forms a new model forming layer is provided on the existing surface formed of both the surface of the support member 6 and the surface of the model forming layer 500 so as to overhang the model forming layer 500 which is formed previously. However, the overhanging shape is not always required, and depending on the shape of the ink pattern, the ink pattern may be provided in some cases on only a part of the existing surface formed of the model forming layer.

Figure 3B:
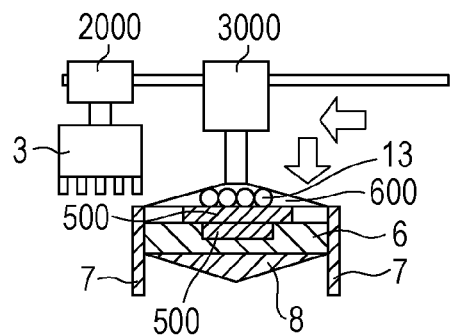

Next, as shown in FIG. 3B, the defining member 600 is lowered down in an arrow direction by the lift mechanism 3000 to press the upper surface (opposite to the existing surface) of the ink pattern 4, so that a new model forming layer 500 is formed.

Figure 3C:
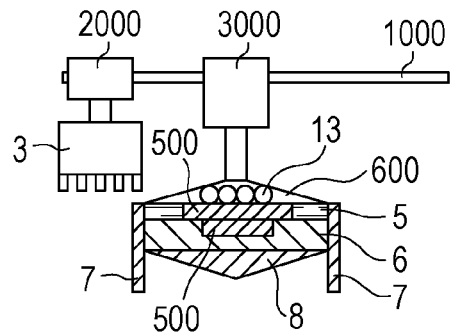

Subsequently, as shown in FIG. 3C, the support material 5 in a fluid state is injected into the model forming container 7 while the upper surface of the model forming layer 500 is defined by the defining member 600. The model forming container 7 has a shape surrounding the periphery of the model forming table 8 and defines the filling region of the support material.

Figure 3D:
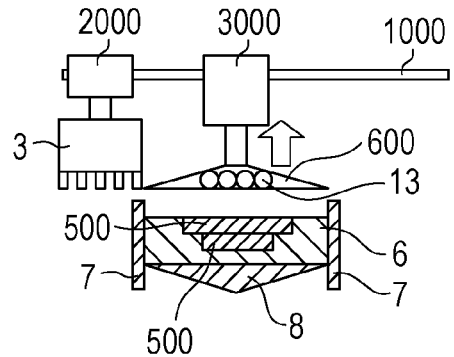

Next, as shown in FIG. 3D, the defining member 600 is lifted up, so that the defining member 600 is removed from the model forming layer 500 and the support member 6. As a result, the upper surface of a layer formed of the new support material 6 and the new model forming layer 500 is exposed. In association with the lift-up of the defining member 600, the model forming table 8 is lowered down by a distance corresponding to the thickness of one layer, so that the formation of the following layer is prepared.

When the layer formation is repeatedly performed predetermined times, a structural body enclosed with the support member is obtained. When the support member is finally removed from the structural body, the formation of the structural body is completed. If the support material is a paraffin wax which is described by way of example together with the apparatus in FIG. 1, by heating the paraffin wax to the melting point thereof or more, the support member 6 can be automatically removed.

When a material which performs a reversible phase change is used as the support material, the support material 5 thus removed may be reused.

Figure 5:
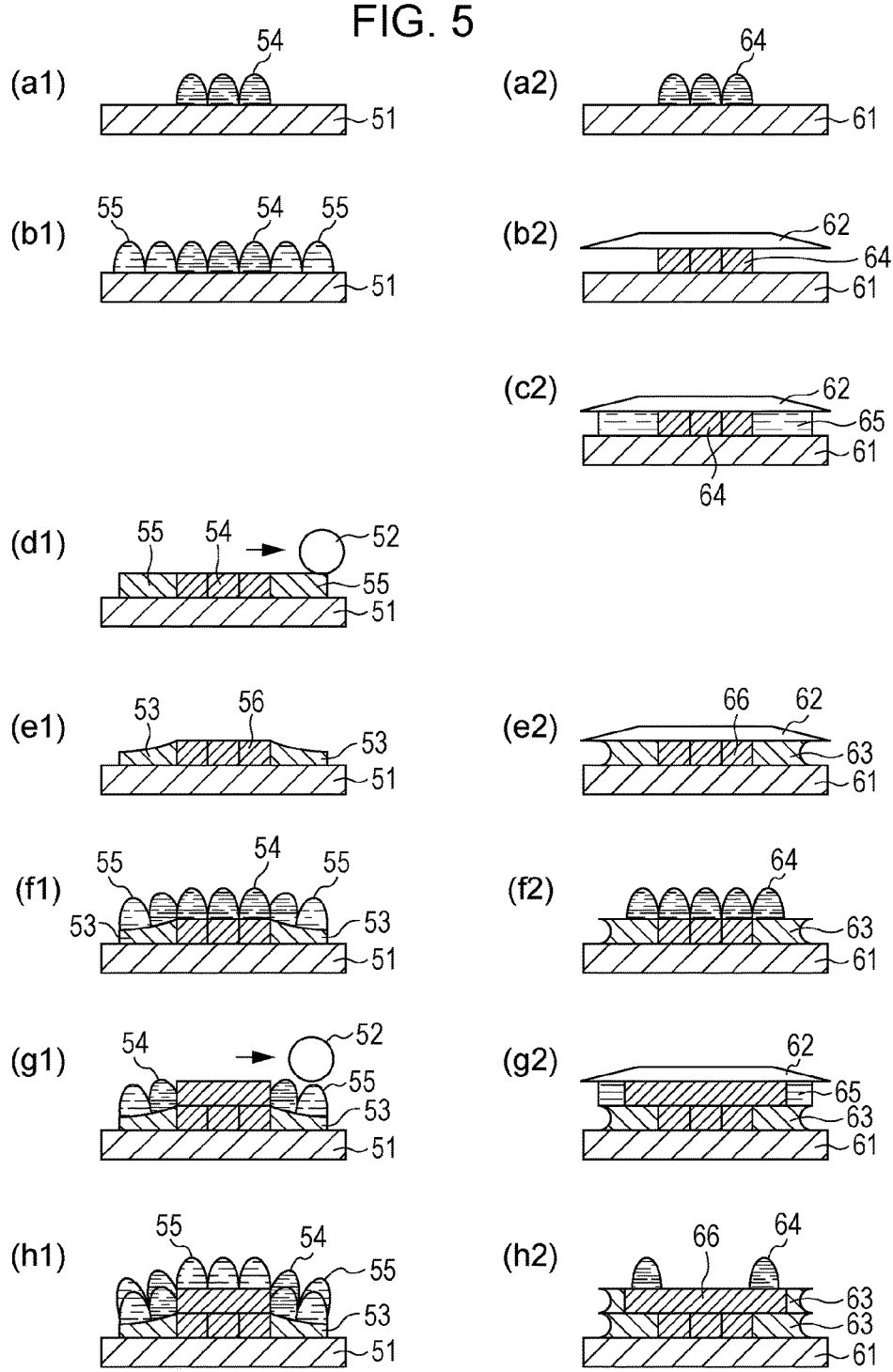
[FIG. 5] FIGS. 5(*a*1) to 5(*h*1) and 5(*a*2) to 5(*h*2) are cross-sectional views illustrating an embodiment and a comparative embodiment by comparison.

FIGS. 5(a1) to 5(h2) are cross-sectional views schematically showing steps of one example of a method for manufacturing a structural body according to an embodiment of the present invention and steps of a method for manufacturing a structural body of a comparative embodiment, and are also cross-sectional views illustrating the influence of the thickness accuracy of a layer-shaped pattern on the object. FIGS. 5(a1) to 5(h1) show a lamination method according to the comparative embodiment, and FIGS. 5(a2) to 5(h2) show a lamination method according to the embodiment of the present invention.

FIG. 5(a1) shows the state in which a model forming pattern 54 composed of a model forming material is formed on a substrate 51.

Next, a support material 55 is disposed along the periphery of the model forming pattern 54 (FIG. 5(b1)). In this step, it is necessary that the support material 55 be accurately disposed with respect to the model forming pattern 54 and be provided with a strict volume control.

Subsequently, the surface of the model forming pattern 54 is ground by a grinding roller 52 to a design thickness of the model forming pattern 54, so that the surface is planarized (FIG. 5(d1)). In this step, a mechanism which prevents grinding scraps from adhering on the model forming pattern is required.

Next, FIG. 5(e1) shows the state in which the model forming material and the support material are progressively cured, and the changes in volume thereof occur. Since the support material is a different material from the model forming material, the rates of change in volume thereof are different from each other, and the degrees of deformation thereof are also different from each other. Since the upper surface of the model forming material 54 and the upper surface of the support material 55 are both open, the contraction occurs in a thickness direction, and as a result, a step is generated between a model forming layer 56 formed of the model forming material and a support member 53.

Subsequently, in a step shown in FIG. 5(f1), although a material is disposed to form the following layer, since the model forming material is supplied on the support member 53 having a smaller thickness, a strain is generated in an object to be formed. Furthermore, as the steps shown in FIGS. 5(g1) and 5(h1) are sequentially performed, the strain tends to increase.

On the other hand, FIGS. 5(a2) to 5(h2) show a lamination method according to the embodiment of the present invention.

FIG. 5(a2) shows the state in which a model forming pattern 64 composed of a model forming material is formed on a substrate 61.

Next, a defining plate 62 is brought into contact with the upper surface of the model forming pattern 64 to set the thickness of the model forming pattern to a design value (FIG. 5(b2)).

Subsequently, a support material 65 is disposed along the periphery of the model forming pattern 64 (FIG. 5(c2)). In this step, the support material 65 is not particularly required to be aligned with the model forming pattern 64 and may be simply provided between the substrate 61 and the defining plate 62 by filling.

Next, FIG. 5(e2) shows the state in which the model forming material and the support material are progressively cured, and the changes in volume thereof occur. Since the support material is a material different from the model forming material, the rate of change in volume of the support material is different from that of the model forming material; however, since the upper surface of the model forming pattern 64 and that of the support material 65 are defined, the contraction thereof occurs only in a side surface direction (lateral direction in the figure), and hence the accuracy of the film thickness can be maintained.

Subsequently, although a material forming the following layer is disposed in a step shown in FIG. 5(f2), since the accuracy in the thickness direction (longitudinal direction in the figure) is maintained, lamination can be performed so as not to deform the object. Furthermore, even when steps are sequentially performed as shown in FIGS. 5(g2) and 5(h2), lamination can be performed with no strain generation to the end of the process.

Figure 4:
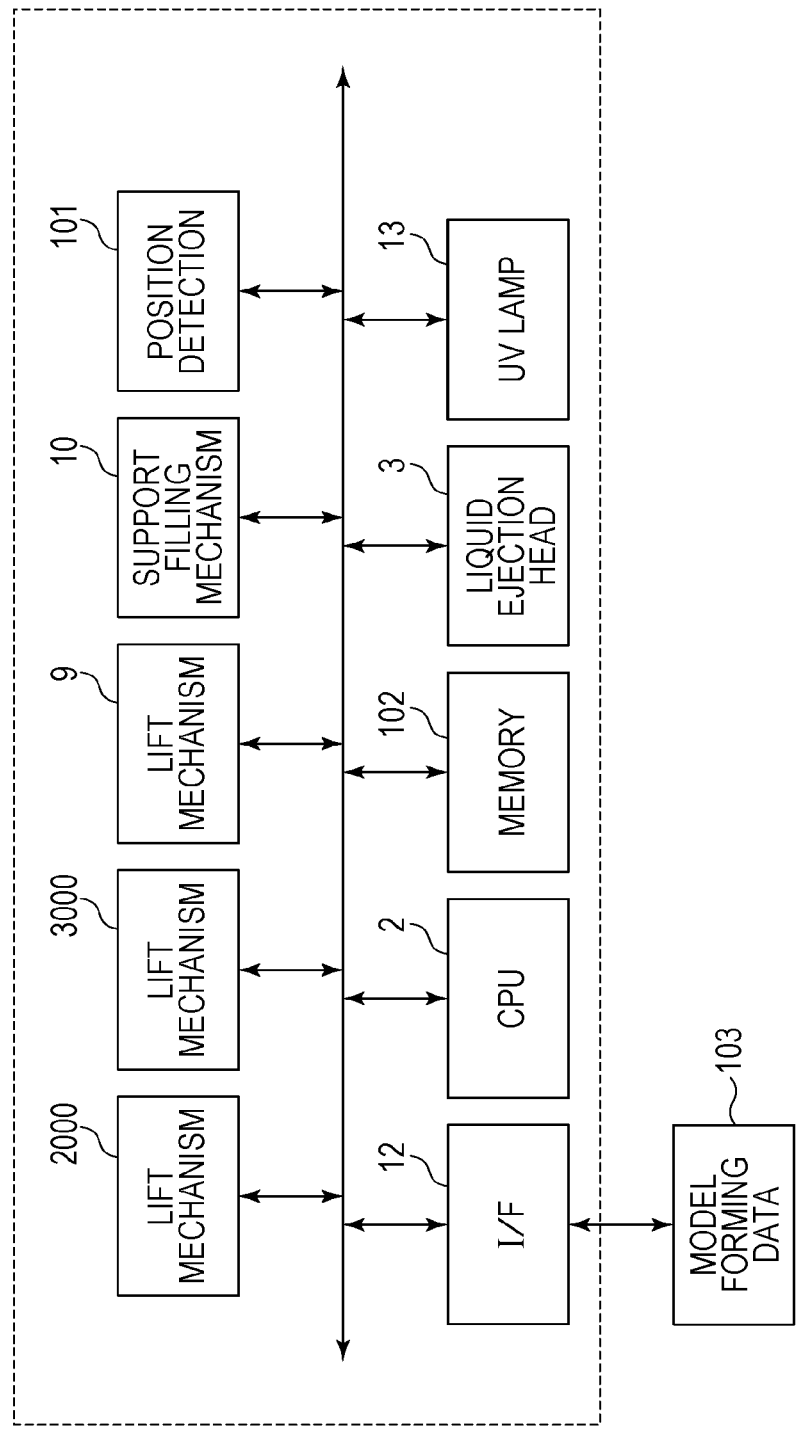
[FIG. 4]

FIG. 4 shows one example of a control system of the model forming apparatus shown in FIG. 1. In the model forming apparatus, the entirety of which is designated by reference numeral 1, reference numeral 2 indicates a CPU forming a main control portion of the entire system, and the CPU 2 controls individual divisions. Reference numeral 102 indicates a memory, and the memory 102 is formed, for example, of a ROM which stores a basic program of the CPU2 and a RAM which performs storage and data processing of a model forming data 103 inputted from an interface 12. When the CPU 2 receives a signal instructing the start of model forming, a process converting the model forming data into a slice data which is to be output together with setting conditions is started, and at the same time, communication for confirming the states of the lift mechanism 2000, the lift mechanism 3000, the liquid ejection head 3, the lift mechanism 9, and the support filling mechanism 10 is performed. When the state in which the model forming is ready to start is confirmed, the lift mechanism 2000 and the lift mechanism 9 are moved to predetermined position by the information from a position detection 101, and an ejection signal is sent to the liquid ejection head 3, so that the model forming is started. The CPU 2 also controls the UV lamps 13.

Example 1

With reference to FIGS. 1 to 2E, an example of the present invention will be described.

Laminate formation is performed by using the apparatus shown in FIG. 1. The data of an object was formed in advance as a CAD data or the like and was converted into a slice data with predetermined intervals. In this example, a slice data with 25 micrometer intervals was used.

First, after a release layer was formed on the model forming table 8, the model forming table 8 was lifted up and fixed, and the defining member 600 was hold above the model forming table 8 with a gap of 25 micrometer therebetween. Next, a molten support material (paraffin wax 115 F (melting point: 47 degree Celsius); commercial product) was injected from the support filling mechanism 10, so that the support material 5 was filled into the space between model forming table 8 and the defining member 600. After the temperature was decreased to solidify the support material, the defining member 600 was lifted up, and the model forming table 8 was lowered down by a distance corresponding to the thickness of one layer (25 micrometer). As a result, the state shown in FIG. 2A was obtained.

Next, by the use of the liquid ejection head 3, the ink pattern 4 composed of an UV ink functioning as a model forming material was supplied on the first layer described above in accordance with a first layer slice data for forming the structural body (FIG. 2B). In this step, since the volume of an ink to be supplied could not be uniformly controlled only by a colored ink, by the use of a clear ink, the ink volume was uniformly controlled.

Ink Supply Conditions
Size of ink droplet: 30 pl
Supply interval between ink droplets: 600 dpi
Volume of ink per address: 150 pl
Ink Composition
Pigment: 1 part
Black: carbon black
Cyan: Pigment Blue 15
Magenta: Pigment Red 7
Yellow: Pigment Yellow 74
White: titanium oxide
Clear: fine silica particles
Styrene-acrylic acid-ethyl acrylate copolymer: 10 parts
(Degree of oxidation: 180, weight average molecular weight 4,000)
Photocurable resin: 20 parts
(Water-soluble trifunctional acrylate)
Photoreaction initiator: 2 parts
(Water-soluble acylphosphine)
Diethylene glycol: 6 parts
Ethylene glycol: 3 parts
Surfactant: 1 part
(Acetylenol EH: manufactured by Kawaken Fine Chemicals Co., Ltd.)
Ion exchanged water: balance After the supply of the ink was finished, the defining member 600 was moved above the model forming table 8, was aligned therewith, and was then lowered down. In addition, the surface (surface with which the UV ink was to be in contact) of the defining member 600 was formed of a glass processed by a releasing treatment, and in the defining member 600, UV lamps were disposed. After the defining member 600 was lowered down to and stopped at a position 25 micrometer apart from the surface of the lower layer, UV irradiation was performed to cure the UV ink, so that the model forming layer 500 was formed (FIG. 2C).

Next, the molten support material 5 was injected from the support filling mechanism 10 (FIG. 2D).

After the support material 5 was filled by the injection, the support material 5 was solidified by cooling to form the support member 6, and the defining member 600 was lifted up (FIG. 2E).

After this operation process was repeatedly performed a designed number of times so that all cross-sectional layers forming the structural body were laminated to each other, when the temperature was increased to 60 degree Celsius, the support member was melted, and as a result, a colored structural body could be recovered.

The structural body thus obtained was formed with a significantly high accuracy, and no delamination could be observed between the layers.

According to the embodiments and the example described above, the surface of the layer forming the structural body and the surface of the layer of the support member can be aligned with an excellent accuracy in a lamination process, and hence, the structural body can be formed with an excellent shape accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127877, filed Jun. 18, 2013, which is hereby incorporated by reference herein in its entirety.

The invention claimed is:

1. A method for manufacturing a structural body in which while an in-process structural body is supported by a support member on a model forming table, a model forming layer which forms the structural body is laminated to form the structural body, the method comprising the steps of:
supplying a liquid model forming material for forming the model forming layer directly on a surface of the in-process structural body using a liquid ejector to eject the liquid model forming material directly on the surface of the in-process structural body;
while a defining surface of a defining member which defines an upper surface of the model forming layer on the surface of the in-process structural body is in contact with the upper surface of the model forming layer, loading a support material which forms the support member into a space, defined by the surface of the in-process structural body, a side surface of the model forming layer, and the defining surface, at a periphery of the model forming layer so as to fill the space and forming the support member by solidifying the support material to form a layer formed by the support member and the model forming layer; and
removing the defining member from the layer formed by the support member and the model forming layer.

2. The method for manufacturing a structural body according to claim 1, further comprising, after the step of removing the defining member, a step of providing a further model forming layer formed of the liquid model forming material, on the surface formed of the model forming layer and the support member which is exposed by the removal of the defining member.

3. The method for manufacturing a structural body according to claim 2, wherein the further model forming layer overhangs the support member on which the further model forming layer is provided.

4. The method for manufacturing a structural body according to claim 1, wherein in the step of supplying a liquid model forming material, the liquid model forming material is supplied on the surface of the in-process structural body by ejecting the liquid model forming material from a liquid ejection head which ejects a liquid.

5. The method for manufacturing a structural body according to claim 1, wherein the liquid model forming material is cured by UV light irradiation, and in the step of forming a model forming layer, the model forming layer is formed by irradiating the liquid model forming material with UV light while the defining surface and the upper surface of the model forming layer opposite to the surface of the in-process structural body are in contact with each other.

6. The method for manufacturing a structural body according to claim 5, wherein the liquid model forming material is irradiated with the UV light through the defining surface of the defining member.

7. The method for manufacturing a structural body according to claim 1, wherein in the loading, the support material is loaded into the space by injecting the support material in a liquid state into the space.

8. The method for manufacturing a structural body according to claim 7, wherein in the solidifying of the support material, the injected support material is solidified by cooling the support material.

9. An apparatus for manufacturing a structural body in which while an in-process structural body is supported by a support member, a model forming layer which forms the structural body is laminated to form the structural body, the apparatus comprising:
a model forming table on which the in-process structural body is placed;
a liquid ejector configured to eject a liquid model forming material for forming the model forming layer to be a part of the structural body directly on a surface of the in-process structural body;
a defining member having a defining surface for contacting with an upper surface of the model forming layer;
a lift mechanism connected to the defining member and configured to lower the defining member towards the model forming table and bring the defining member into contact with the upper surface of the model forming layer formed by the liquid ejector on the surface of the in-process structural body; and
a material injector configured to supply a support material forming the support member with a periphery of the model forming layer and to form the support member,
wherein while the defining surface and the upper surface of the model forming layer are in contact with each other by the lift mechanism, the liquid injector supplies the support material into a space, defined by the surface of the in-process structural body, a side surface of the model forming layer, and the defining surface, so as to fill the space and solidifies the support material to form the support member, and
the lift mechanism removes the defining member from a layer formed of the support member formed by the material injector and the model forming layer formed by the liquid ejector.

10. The apparatus for manufacturing a structural body according to claim 9, wherein the liquid ejector provides a further model forming layer, on the surface of the layer formed of the model forming layer and the support member which is exposed by removing the defining member by the lift mechanism.

11. The apparatus for manufacturing a structural body according to claim 10, wherein the further model forming layer overhangs the support member on which the further model forming layer is provided.

12. The apparatus for manufacturing a structural body according to claim 9, wherein the liquid ejector includes a liquid ejection head which ejects a liquid, and the liquid ejection head ejects the liquid model forming material on the surface of the in-process structural body.

13. The apparatus for manufacturing a structural body according to claim 9, wherein the liquid ejector further includes a UV light source and irradiates the liquid model forming material with UV light.

14. The apparatus for manufacturing a structural body according to claim 9, wherein the defining member is formed of a material which allows UV light to pass therethrough, and a UV light source is inside the defining member and the model forming layer forming device irradiates the liquid model forming material with UV light through the defining member.

15. The apparatus for manufacturing a structural body according to claim 9, wherein the material injector supplies the support material into the space by injecting the support member in a liquid state into the space.

16. The apparatus for manufacturing a structural body according to claim 15, wherein the material injector solidifies the support material by cooling the support material.

* * * * *